United States Patent Office 3,810,799
Patented May 14, 1974

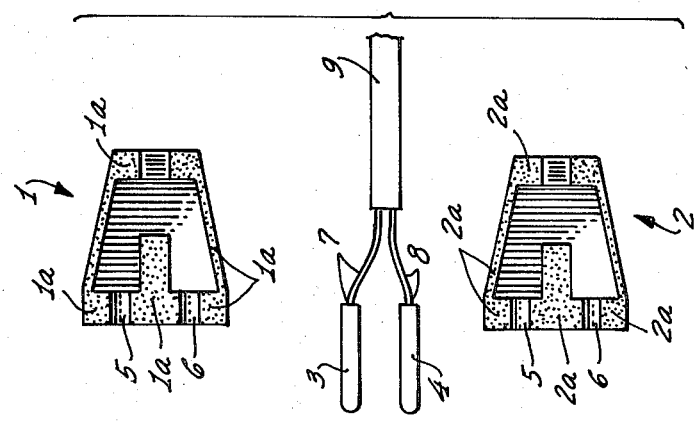
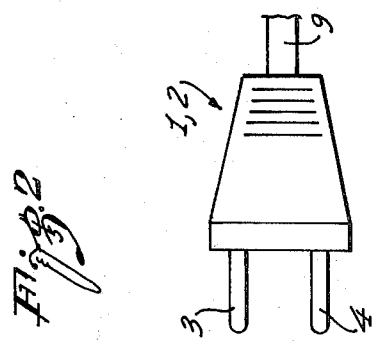
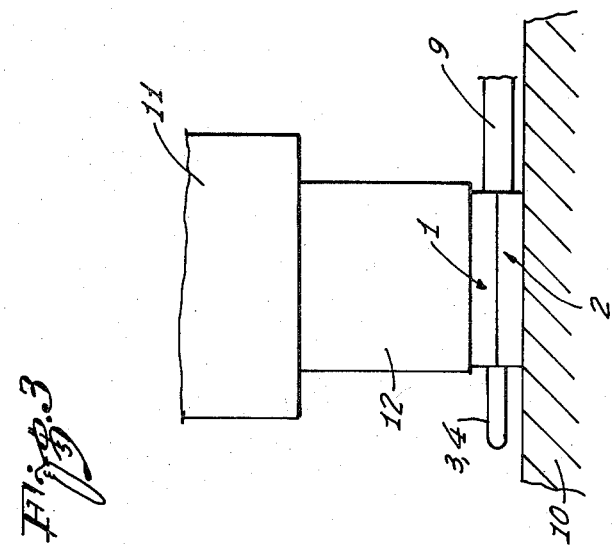

3,810,799
METHOD OF PREPARING POLYETHYLENE PARTS FOR ULTRASONIC WELDING
Horst Rager, Nuremberg, Herbert Rohrig, Schwarzenbruck-Gsteinach, and Armin Hirschel, Fischbach, Germany, assignors to Kabel- und Metallwerke Gutehoffnungshutte Aktiengesellschaft, Hannover, Germany
Filed Apr. 5, 1972, Ser. No. 241,348
Claims priority, application Germany, Apr. 6, 1971, P 21 16 656.3
Int. Cl. B32b 31/30
U.S. Cl. 156—73    2 Claims

ABSTRACT OF THE DISCLOSURE

Method of making plastic components, extruding a mixture of 100 parts PE and of 20 to 70 parts chalk and joining the extruded parts by means of ultrasonic energy.

BACKGROUND OF THE INVENTION

The present invention relates to a method for making plastic components to be welded by means of ultrasonic energy, whereby particularly the plastic components are made from a material which has polyethylene basis.

Ultrasonic welding is a technique which has become increasingly important, particularly for mass production of articles such as, for example, plugs, electrical connectors, or the like. Such electrical connecting parts have to be made of insulating material and should be releasably secured to the end of cables, conductors etc. Ultrasonic welding is particularly suited for making a reliable connecting between different plastic parts. Furthermore, ultrasonic welding lends itself very well to automated manufacturing process, and it is also of advantage to use the same material for parts to be affixed to each other as that reduces costs. Also, supplementing parts can readily be fused to principal parts, e.g., of a plug element, when using ultrasonics, for obtaining immediate structural integration. Such additions may serve, for example, as tension relief, so that no separate and special parts have to be included for that purpose.

It was found that many plastics can be welded through application of ultrasonic energy. However, it is also well known that the rather widely used polyethylene (PE) in its known consistency, is not suitable for this welding technique. This is very unfortunate because PE is a particularly good electrical insulator. Still, many plug elements are made from PE in spite of the fact that ultrasonic welding cannot be used in the assembly process and even though, other welding methods are both, more expensive and less reliable than ultrasonics. It should be mentioned that it is indeed widely known that PE cannot be welded by ultrasonic energy, and vendors of ultrasonic welding equipment actually inform the customer of this unfortunate deficiency.

DESCRIPTION OF THE INVENTION

It is an object of the present invention to provide a method that permits ultrasonic welding of polyethylene parts. In accordance with the preferred embodiment of the present invention, it is suggested to make the parts to be welded from the following mixture:

100 parts of a low pressure polyethylene are mixed with 20 to 70 parts chalk; preferably 30 parts chalk are used. The mixture is then, e.g. extruded, and the resulting parts can be fused through application of ultrasonic energy. The invention offers the advantage that upon adding sufficient amounts of chalk to polyethylene parts made from the resulting plastic material can, in fact, be welded by means of ultrasonic energy. Adding chalk does not deteriorate the good insulative properties of PE. Moreover, as an added advantage, it was found that parts made of that mixture have an extremely smooth surface.

These materials may be mixed in granular consistency and heated to obtain an integrally, fused mass. Actually, the parts to be made are usually extruded, and the fusion may well occur during the extrusion process.

While the specification, concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 shows the parts of a plug element to be connected to each other and receiving a conductor pair;

FIG. 2 shows the parts of FIG. 1 as assembled; and

FIG. 3 is a schematic representation of the ultrasonic welding process.

DESCRIPTION OF THE DRAWINGS

Two similar plug-halves, 1 and 2, have been made by extruding a PE-chalk mixture as described. They are now to be joined, fused and welded for obtaining an integral plug element. 3 and 4 are two plug pins respectively, which are to be received individually by two indentations 5 and 6 in each of the parts 1 and 2. Wires 7 and 8 of a conductor pair or cable 9 are to be connected or are already connected to these pins. These being the components to be combined into a structural unit.

Upon assembling such a plug element, the plug pins 3 and 4 are first laid into the indentations 5 and 6 of part 2, and then these two pins are connected with wires 7 and 8 of the cable 9 (e.g. welded, soldered, etc.) However, the pins may have been connected already previously to the wire ends, the sequence is not important for the invention. Next, part 1 is matingly positioned on part 2 and there results the configuration as shown in FIG. 2. The dotted areas, 1a and 2a, of parts 1 and 2, as shown in FIG. 1, are now juxtaposed in surface-to-surface contact. These are the surface areas to be fused by an ultrasonic welding process.

Next, the as yet loosely assembled plug element is placed on a table 10 of an ultrasonic welding machine 11, and the plunger-electrode 12 of the machine is lowered s shown in FIG. 3. Now, the two parts, 1 and 2, are welded to each other. Not only are parts 1 and 2 fused by ultrasonic welding process, but depending on the material used as insulator sheathing for cable 6 that sheathing may or may not be bonded and fused to the material of the parts 1 and 2 at the combined opening they now form and through which the cable enters the interior of the newly formed plug element.

After the plunger 12 of the ultrasonic machine has been lifted off the plug element, the plug element with pins inserted as well as with inserted wire ends of the cable or conductor pair, can be removed as a unit.

The particular advantage of the method in accordance with the invention is to be seen in that polyethylene components can be made at lower cost. Parts, such as 1 and 2, when made from polyethylene with chalk added as mentioned above, can be joined and affixed to each other by means of ultrasonic welding. Therefore, this particular material, which is so advantageous in electrical engineering, can now be used for making parts to be combined by ultrasonic welding method, and the utilization of that welding method increases reliability and production yield.

The invention is not limited to the embodiments described above but all changes and modifications thereof not constituting departures from the spirit and scope of the invention are intended to be included.

We claim:
1. Method of making plastic components comprising the steps of:
   providing a mixture of 100 parts of a low pressure PE and of 20 to 70 parts chalk;
   extruding parts from the mixture; and
   joining the extruded parts by ultrasonic welding for obtaining the components.
2. Method in accordance with claim 1, wherein 30 parts of chalk are used.

References Cited
UNITED STATES PATENTS

| | | | |
|---|---|---|---|
| 3,160,598 | 12/1964 | Delfosse | 260—41 R |
| 3,257,351 | 6/1966 | Kraus et al. | 260—41 R |
| 3,331,719 | 7/1967 | Soloff | 156—73 |
| 3,651,615 | 3/1972 | Bohner et al. | 156—73 X |

EDWARD G. WHITBY, Primary Examiner

156—244; 260—41 R